(12) United States Patent
Smock et al.

(10) Patent No.: US 12,260,662 B2
(45) Date of Patent: Mar. 25, 2025

(54) INFERRING STRUCTURE INFORMATION FROM TABLE IMAGES

(71) Applicant: Microsoft Technology Licensing, LLC, Redmond, WA (US)

(72) Inventors: J Brandon Smock, Seattle, WA (US); Pramod Kumar Sharma, Seattle, WA (US); Natalia Larios Delgado, Kirkland, WA (US); Rohith Venkata Pesala, Frisco, TX (US); Robin Abraham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 367 days.

(21) Appl. No.: 17/353,563

(22) Filed: Jun. 21, 2021

(65) Prior Publication Data
US 2022/0335240 A1 Oct. 20, 2022

Related U.S. Application Data

(60) Provisional application No. 63/175,446, filed on Apr. 15, 2021.

(51) Int. Cl.
*G06F 17/00* (2019.01)
*G06F 18/214* (2023.01)
*G06F 40/103* (2020.01)
*G06N 3/045* (2023.01)
*G06N 3/088* (2023.01)
(Continued)

(52) U.S. Cl.
CPC .......... *G06V 30/412* (2022.01); *G06F 18/214* (2023.01); *G06F 40/103* (2020.01); *G06N 3/045* (2023.01); *G06N 3/088* (2013.01); *G06V 30/414* (2022.01)

(58) Field of Classification Search
CPC .. G06V 30/412; G06V 30/414; G06F 40/103; G06F 18/214; G06N 3/045; G06N 3/088
See application file for complete search history.

(56) References Cited

U.S. PATENT DOCUMENTS 6,173,073 B1 * 1/2001 Wang ................... G06V 30/412
382/175
6,757,870 B1 * 6/2004 Stinger ................. G06F 40/143
715/234

(Continued)

FOREIGN PATENT DOCUMENTS

| EP | 3570208 A1 | 11/2019 |
| JP | 6838209 B1 | 3/2021 |
| WO | 2020264155 A1 | 12/2020 |

OTHER PUBLICATIONS

"International Search Report and Written Opinion Issued in PCT Application No. PCT/US22/023185", Mailed Date: Oct. 13, 2022, 11 Pages.

*Primary Examiner* — Mohammed H Zuberi
(74) *Attorney, Agent, or Firm* — Schwegman Lundberg & Woessner, P.A.

(57) ABSTRACT

A computer implemented method includes rendering a document page as an image; detecting tables, columns, and other associated table objects within the image via one or more table recognition models that model objects in the image as overlapping bounding boxes; transforming the set of objects into a structured representation of the table; extracting data from the objects into the structured representation; and exporting the table into the desired output format.

19 Claims, 17 Drawing Sheets

(51) Int. Cl.
*G06V 30/412* (2022.01)
*G06V 30/414* (2022.01)

(56) References Cited

U.S. PATENT DOCUMENTS

| | | | | |
|---|---|---|---|---|
| 6,778,700 | B2 * | 8/2004 | Karidi | G06V 30/413 382/199 |
| 6,865,720 | B1 * | 3/2005 | Otani | G06F 40/177 715/776 |
| 7,099,507 | B2 * | 8/2006 | Ouchi | G06V 30/416 382/176 |
| 7,668,404 | B2 * | 2/2010 | Adams | G06V 10/24 382/101 |
| 7,707,488 | B2 * | 4/2010 | Gurcan | G06F 40/103 715/228 |
| 7,747,089 | B2 * | 6/2010 | Mori | G06V 30/413 382/173 |
| 7,801,358 | B2 * | 9/2010 | Furmaniak | G06V 30/416 382/176 |
| 8,095,871 | B2 * | 1/2012 | Liu | G06F 16/86 715/239 |
| 8,144,986 | B2 * | 3/2012 | Ma | G06V 30/18086 382/169 |
| 8,155,442 | B2 * | 4/2012 | Ma | G06T 5/009 382/169 |
| 8,214,733 | B2 * | 7/2012 | Bastos dos Santos | G06F 40/174 715/224 |
| 8,271,533 | B2 * | 9/2012 | Williams | G06F 16/22 707/791 |
| 8,380,753 | B2 * | 2/2013 | Mansfield | G06F 40/137 707/791 |
| 8,385,643 | B2 * | 2/2013 | Li | G06V 30/414 382/305 |
| 8,443,278 | B2 * | 5/2013 | Mansfield | G06V 30/414 715/227 |
| 8,463,040 | B2 * | 6/2013 | Le Glaunec | G06V 30/412 382/176 |
| 8,731,296 | B2 * | 5/2014 | Xiao | G06V 30/155 382/175 |
| 8,818,100 | B2 * | 8/2014 | Bastos dos Santos | G06F 40/174 382/173 |
| 9,047,528 | B1 * | 6/2015 | Guha | G06V 10/267 |
| 9,235,757 | B1 * | 1/2016 | Liu | G06V 20/62 |
| 9,697,423 | B1 * | 7/2017 | Bellert | G06V 30/412 |
| 9,898,523 | B2 * | 2/2018 | Cox | G06F 40/18 |
| 9,953,008 | B2 * | 4/2018 | Zaric | G06F 40/103 |
| 9,990,347 | B2 * | 6/2018 | Raskovic | G06V 30/148 |
| 10,076,751 | B2 * | 9/2018 | Samper | B01J 19/0093 |
| 10,242,257 | B2 * | 3/2019 | Hosabettu | G06V 30/414 |
| 10,410,386 | B2 * | 9/2019 | Bellert | G06T 11/203 |
| 10,740,638 | B1 * | 8/2020 | Annis | G06V 30/412 |
| 10,853,565 | B2 * | 12/2020 | Yu | G06F 40/177 |
| 11,200,413 | B2 * | 12/2021 | Burdick | G06F 40/284 |
| 11,650,970 | B2 * | 5/2023 | Chen | G06F 16/2282 707/802 |
| 11,810,380 | B2 * | 11/2023 | Arroyo | G06N 3/045 |
| 2007/0186152 | A1 * | 8/2007 | Gurcan | G06F 40/103 715/209 |
| 2015/0026556 | A1 * | 1/2015 | Stadermann | G06F 40/183 715/227 |
| 2016/0055376 | A1 * | 2/2016 | Koduru | G06V 30/412 382/176 |
| 2018/0204111 | A1 * | 7/2018 | Zadeh | G06V 10/764 |
| 2019/0026550 | A1 * | 1/2019 | Yang | G06V 30/19147 |
| 2019/0050381 | A1 * | 2/2019 | Agrawal | G06V 30/414 |
| 2019/0266394 | A1 * | 8/2019 | Yu | G06V 30/413 |
| 2019/0278853 | A1 * | 9/2019 | Chen | G06F 16/2282 |
| 2019/0340240 | A1 * | 11/2019 | Duta | G06V 30/15 |
| 2020/0175267 | A1 * | 6/2020 | Schäfer | G06V 30/413 |
| 2020/0410231 | A1 * | 12/2020 | Chua | G06F 18/2413 |
| 2021/0279271 | A1 * | 9/2021 | Khanafer | G06T 7/162 |
| 2021/0366099 | A1 * | 11/2021 | Liao | G06F 40/216 |
| 2022/0121821 | A1 * | 4/2022 | Yaramada | G06V 30/19007 |
| 2022/0222284 | A1 * | 7/2022 | Sahoo | G06F 16/35 |
| 2023/0385559 | A1 * | 11/2023 | Ward | G06V 30/10 |

* cited by examiner

| | | EDV[ML] | | | ESV [ML] | | | EF[%] | |
|---|---|---|---|---|---|---|---|---|---|
| | | PRE | POST | Δ% | PRE | POST | Δ% | PRE | POST |
| 1 | RESP | 210 | 108 | -48% | 175 | 70 | -60% | 17% | 35% |
| 2 | RESP | 146 | 69 | -53% | 103 | 38 | -63% | 29% | 45% |
| 3 | RESP | 263 | 201 | -23% | 174 | 98 | -43% | 34% | 51% |
| 4 | NR | 125 | 152 | +22% | 96 | 113 | +18% | 23% | 26% |
| 5 | NR | 230 | 219 | -5% | 194 | 185 | -5% | 16% | 16% |
| 6 | NR | 162 | 124 | -23% | 128 | 87 | -32% | 21% | 30% |

FIG. 4

| | CONTROLS | DCM | OHCM |
|---|---|---|---|
| EDV [ML] | 105 ± 24 | 233 ± 69 | 131 ± 47 |
| ESV [ML] | 45 ± 12 | 179 ± 48 | 44 ± 16 |
| EF [%] | 57 ± 6 | 22 ± 8 | 65 ± 5 |
| GLS [%] | -20 ± 3 | -7 ± 2 | -18 ± 3 |
| GCS [%] | -27 ± 5 | -8 ± 4 | -34 ± 5 |

FIG. 5

|   | EDV (ML) PRE | EDV (ML) POST | EDV (ML) Δ% | ESV (ML) PRE | ESV (ML) POST | ESV (ML) Δ% | EF (%) PRE | EF (%) POST |
|---|---|---|---|---|---|---|---|---|
| 1 | RESP | 210 | 108 | -48% | 175 | 70 | -60% | 17% | 35% |
| 2 | RESP | 146 | 69 | -53% | 103 | 38 | -63% | 29% | 45% |
| 3 | RESP | 263 | 201 | -23% | 174 | 98 | -43% | 34% | 51% |
| 4 | NR | 125 | 152 | +22% | 96 | 113 | +18% | 23% | 26% |
| 5 | NR | 230 | 219 | -5% | 194 | 185 | -5% | 16% | 16% |
| 6 | NR | 162 | 124 | -23% | 128 | 87 | -32% | 21% | 30% |

| Parameter | Patients with response, n (%) [95% confidence interval] | | | |
|---|---|---|---|---|
| | Stratum 1 (n = 16) | Stratum 2 (n = 8) | Stratum 3 (n = 2) | Overall (n = 26) |
| Response (CR + PR) rate | 1 (6.3) [0.2-30.2] | 0 [0.0-36.9] | 0 [0.0-84.2] | 1 (3.8) [0.1-19.6] |
| Best overall response | | | | |
| CR | 0 [0.0-20.6] | 0 [0.0-36.9] | 0 [0.0-84.2] | 0 [0.0-13.2] |
| PR | 1 (6.3) [0.2-30.2] | 0 [0.0-36.9] | 0 [0.0-84.2] | 1 (3.8) [0.1-19.6] |
| SD | 8 (50.0) [24.7-75.3] | 3 (37.5) [8.5-75.5] | 1 (50.0) [1.3-98.7] | 12 (46.2) [26.6-66.6] |
| PD | 7 (43.8) [19.8-70.1] | 4 (50.0) [15.7-84.3] | 1 (50.0) [1.3-98.7] | 12 (46.2) [26.6-66.6] |
| NE | 0 [0.0-20.6] | 1 (12.5) [0.3-52.7] | 0 [0.0-84.2] | 1 (3.8) [0.1-19.6] |

FIG. 8

| Parameter | Patients with response, n (%) [95% confidence interval] | | | |
|---|---|---|---|---|
| | Stratum 1 (n = 16) | Stratum 2 (n = 8) | Stratum 3 (n = 2) | Overall (n = 26) |
| Response (CR + PR) rate | 1 (6.3) [0.2-30.2] | 0 [0.0-36.9] | 0 [0.0-84.2] | 1 (3.8) [0.1-19.6] |
| Best overall response | | | | |
| CR | 0 [0.0-20.6] | 0 [0.0-36.9] | 0 [0.0-84.2] | 0 [0.0-13.2] |
| PR | 1 (6.3) [0.2-30.2] | 0 [0.0-36.9] | 0 [0.0-84.2] | 1 (3.8) [0.1-19.6] |
| SD | 8 (50.0) [24.7-75.3] | 3 (37.5) [8.5-75.5] | 1 (50.0) [1.3-98.7] | 12 (46.2) [26.6-66.6] |
| PD | 7 (43.8) [19.8-70.1] | 4 (50.0) [15.7-84.3] | 1 (50.0) [1.3-98.7] | 12 (46.2) [26.6-66.6] |
| NE | 0 [0.0-20.6] | 1 (12.5) [0.3-52.7] | 0 [0.0-84.2] | 1 (3.8) [0.1-19.6] |

INFERRING STRUCTURE INFORMATION FROM TABLE IMAGES

RELATED APPLICATION

This application claims priority to United States Provisional Application Ser. No. 63/175,446 (entitled Inferring Structure Information from Table Images, filed Apr. 15, 2021) which is incorporated herein by reference.

BACKGROUND

A table is a universal format for organizing, storing, and communicating data and information. Digital representations of tables, in databases or in file formats such as Excel and CSV, store the information within a table in a structured format that, most importantly, preserves the key-value relationships among its entries by defining the relationships between data in the table. This enables a table's content to be used in automated downstream applications, such as data visualization, aggregation of data across multiple sources, and statistical analysis.

For reasons such as flexibility, ease of creation, and ease of transmission, tables are often stored and distributed in unstructured and primarily visual formats, such as a PDF document or as an image. This preserves the information within a table in a human-readable form, but without explicit structure information this information cannot be put to use within a computer system. This impedance greatly limits the value that can be extracted from the information a table contains.

Some formats like HTML contain specific markup information specifying the structure of the data in tables. In such cases, it is somewhat easier to detect tables within documents/pages and even extract the data. However, in document formats that are more targeted at presentation, like PDF documents, there is no markup information for tables. Many publications, such as research publications and enterprise reports tend to be in PDF format.

SUMMARY

A computer implemented method includes rendering a document page as an image; detecting tables, columns, and other associated table objects within the image via one or more table recognition models that model objects in the image as overlapping bounding boxes; transforming the set of objects into a structured representation of the table; extracting data from the objects into the structured representation; and exporting the table into the desired output format.

BRIEF DESCRIPTION OF THE DRAWINGS

FIG. 4 is an example extracted table according to an example embodiment.

FIG. 5 is an example extracted table according to an example embodiment.

FIG. 6 is an example of data extracted from a recognized table according to an example embodiment.

FIG. 7 is an example document illustrating an identified table according to an example embodiment.

FIG. 8 illustrates identification of cell structure in an extracted table according to an example embodiment.

FIG. 9 illustrates inferred cells of an extracted table according to an example embodiment.

FIGS. 10, 11, and 12 illustrate various table object classes identified according to an example embodiment.

DETAILED DESCRIPTION

Figure 1:
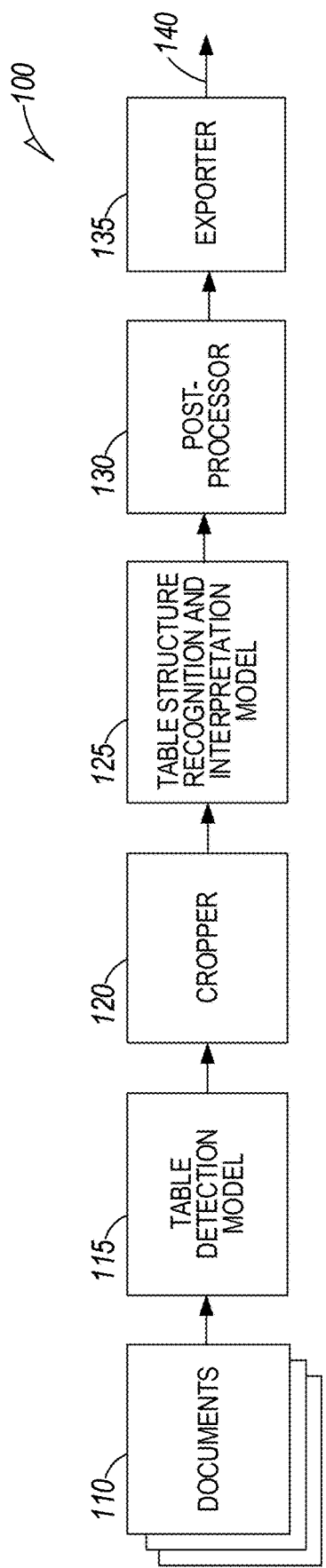
FIG. 1 is a block diagram of a document processing system that identifies tables in documents and infers table structure information from the tables according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Much data in enterprises is locked up in documents. Such documents may range from experiment reports and contracts to manufacturing instructions and market surveys. Business processes might also generate documents that conform to templates that evolve over time. The ability to extract the tables from such documents provided by the document processing system makes the data computable, and information can be reused.

A document processing system recognizes tables from various documents that do not contain structure information regarding the tables. The system generates structure information for the recognized tables enabling the selection, editing, and exporting of the data into multiple different applications.

FIG. 1 is a block diagram of a document processing system 100 that receives documents 110, identifies tables using a trained table detection machine learning model 115 to identify table bounding boxes with corresponding confidence levels, crops the tables at a cropper 120 from the document using the table bounding boxes and uses a further trained table structure recognition and interpretation model 125 to identify potentially overlapping object bounding boxes within the tables as well as a confidence for each identified bounding box. In one example, there are six different types of bounding boxes or objects that the table structure recognition object detection model 125 is trained to recognize. A post-processor 130 is then used to transform the set of detected objects into a structured representation of the table. The structured representation includes structure data along with information detected within the objects. Information within the objects may be subjected to text recognition prior to being added to the structured representation of the table. The structured representation may be in a canonical form that may be converted and exported at 135 to a desired output data format 140. The canonical form may include a list of cells by row and column as well as values within the cells. The canonical form may also include a box identifier and an object type.

Each of the models 115 and 125 may be convolutional neural network models commonly used to identify objects in images, such as distinguishing between cats and dogs. The same principals apply with respect to first recognizing tables from pages of documents, and then recognizing the various types of objects within the tables.

The joint modeling of table structure recognition and table interpretation as an object detection problem is achieved using six object classes in one example. The terms object, container, and bounding box are used somewhat interchangeably. Bounding boxes for objects from different classes can coincide and potentially overlap with one or more other bounding boxes. Modeling the structure and interpretation of a table jointly in this way is a much more robust and efficient mechanism than modeling them independently in parallel or in sequence. The model 125 is trained with labeled images of tables, with the labels corresponding to the six different types of bounding boxes, which are referred to as objects, a nomenclature commonly used with object detection models.

The first three classes are columns, rows, and supercells (also called "merged cells" or "spanning cells"). These three classes recognize the cell structure of the table. Each intersection of a column and a row forms a grid cell. The supercell object class detects when grid cells in the table are merged.

The second three classes are column headers, row headers, and subheaders (also called "projected row headers"). These three object classes are used to interpret the table. They identify which cells contain access cells, or keys, and which cells contain data cells, or values. Column headers objects group together and identify the access cells that usually appear at the top of the table. Row header objects group together and identify the access cells that usually appear on the left of the table. A subheader is a special object class that appears in many tables presented within documents. A subheader occurs when a supercell coincides with a row. In this case, the content of the supercell is meant to join with one or more cells below it in the row header to form compound keys. This table design saves horizontal space, as it is equivalent to having an additional column of supercells in the leftmost portion of the row header.

In the current implementation, the model 125 for object detection is achieved using a convolutional neural network and a transformer network. Unlike other architectures for object detection, this architecture can implement object detection with a generality sufficient to output the complete set of table objects, including columns, rows, headers, and supercells, etc.

Until recently, advances in deep learning for object detection primarily targeted a specialized version of the object detection problem: detecting objects in natural images. Objects in natural images typically require only local context to be reliably detected, which simplifies the modeling required. Overlap between bounding boxes in this setting is typically interpreted as occlusion. Thus, in object detection in settings such as these, two objects could never have the same bounding box, and every bounding box could be assumed to have a single classification label.

Objects in documents and tables, on the other hand, have key differences from objects in natural scenes. For one, table structure objects require more of a global context to be recognized, which only certain model architectures for object detection can achieve. Also, overlap between certain table structure objects should be interpreted as a hierarchical relationship between them, rather than as occlusion.

In the special case of a subheader, the subheader always coincides exactly with a row—they have the same bounding box. Objects like these can only be modeled with an approach that does not assume that bounding boxes never completely coincide (such as the one used here), or an approach that assumes unique bounding boxes but changes the classification objective from multi-class to multi-label. However, this second approach, which has often been attempted, is almost never done in practice, as object detection architectures are engineered for multi-class classification and typically exhibit much worse performance when used for multi-label classification.

As deep learning methods are statistical in nature, a table recognition system using deep learning is not guaranteed to produce an output that corresponds to a real table. System 100 applies a procedure via post-processor 130 to the output of the machine learning model to resolve conflicts and inconsistencies among the detected objects, such as eliminating overlap between objects of the same class.

The table detection model 115 in one embodiment is a DETR (detection transformer) neural network model, composed of three submodules in sequence: a convolutional neural network (CNN) backbone, followed by a transformer encoder and then a transformer decoder. The CNN backbone is a ResNet-18 model. The transformer encoder and decoder each have six layers of self-attention, and each has 8 attention heads, 256 hidden dimensions, and a feed-forward dimensionality of 2048.

The input to the table detection model 115 is an image of a document page, which for example, can be rendered electronically, scanned, or photographed. The output of the model is a set of bounding box and class predictions, where a bounding box is denoted by four coordinates describing the locations of the four edges of the bounding box rectangle, and the class prediction is both a class label and a confidence score between 0 and 1. There are three class labels in the primary version of the model: table, table-rotated, and no-object. The "table-rotated" class detects tables that are rotated 90 degrees counter-clockwise with respect to the tables in the "table" class.

In another version of the model, there are additional output classes, including "table caption", "table footer", "table block", and two more classes for detecting additional table orientations. The "table block" class is the minimum bounding box enclosing a table and its associated caption and footer. This is a novel output class introduced in this model, and it enables the model to learn how to automatically associate a table with its caption and footer. This replaces the use of rule-based approaches.

The table structure recognition and interpretation model, which we also refer to as the table structure model 125, is a DETR neural network model, composed of three submodules in sequence: a CNN backbone, followed by a transformer encoder and then a transformer decoder. The CNN backbone is a ResNet-18 model. The transformer encoder and decoder each have six layers of self-attention, and each has 8 attention heads, 256 hidden dimensions, and a feed-forward dimensionality of 2048.

The input to the table structure model 125 is a cropped image of a table within a document page, which can be cropped according to the table bounding box produced by the detection model, or otherwise created. The output of the model is a set of bounding box and class predictions, where a bounding box is denoted by four coordinates describing the locations of the four edges of the bounding box rectangle, and the class prediction is both a class label and a confidence score between 0 and 1. There are seven class labels in the primary version of the model: column, row, supercell, column header, row header, subheader, and no-object.

In another version of the model 125, "table" is added as an eighth output class. A table structure model 125 with this output class can have as input an image of a table that is not tightly cropped to the exact table boundary, and the model can learn to determine a more precise table boundary within the input image. This can create a more robust two-stage pipeline for table extraction, as errors in the localization of the table produced by the table detection model can be corrected by the table structure model.

The collection of bounding boxes output by the table structure model 125 corresponding to a single table are fed to a post-processing 130 stage, which also takes as input the bounding boxes for the words that lie within the bounding box of the table, and outputs a structured representation of the table. These word bounding boxes can be extracted directly from the document, in the case of an electronic format such as PDF, or can be produced using OCR on an image of the document.

The properties of a cell in the structure representation include the row and column numbers it lies in; its role as either a column header, row header, subheader, or non-header (data) cell; and the words that it contains, represented either as a list of words or a text string. Additional properties such as text alignment (left, center, right) within the cell are also possible if these need to be preserved, but these are considered optional display properties.

To create this structured representation, several steps are taken, including: overlap is eliminated between any predicted bounding boxes of the same class, rows and columns are expanded to fill any gaps between them within the table boundary, rows and columns are intersected to form grid cells, cells falling in the same supercell bounding box must be merged into a single cell, each word must be uniquely assigned to a cell, and cells must be labeled by their role using the column header and row header predictions.

In the final stage, exporter 135, the canonical structured table representation is exported to the desired output format, which for example can be the structured representation from the previous stage, a CSV format, Excel, or other possibilities. Some of these formats may not explicitly preserve all of the information contained within the structured representation, but certain conventions can be used to preserve as much information as possible.

In the case of a CSV, for example, it may be assumed that the first row of the CSV file is the column header for the table. If the structured representation has less than 1 or more than 1 row in the column header, additional conventions are needed to represent this within a CSV format. When there are no rows in the column header, this can be represented using a first row of blank entries. If there are multiple rows in the column header, the text content of each cell in each column of the column header must be concatenated from top to bottom. A special delimiter such as "|" can be used to indicate where concatenation occurred.

Modeling table structure recognition and interpretation jointly as a single set of objects to be detected, however, not only enables the system 100 to be highly efficient, but it also enables the system to be more accurate, as the dependencies among the objects can be captured in a way that promotes a consistent output. Thus, the joint modeling greatly reduces the post-processing needed because it prevents many contradictions from occurring in the first place.

While system 100 uses an image as input, it is not limited only to image input, and would be just as applicable to other input types with the same set of objects as output.

Because objects are easily understood and interpreted by a human, framing the table structure recognition and interpretation problems this way also enables the system to place humans in the loop. As the objects detected by both models 115 and 125 are intermediate outputs of the system 100, these outputs can be reviewed by a human for mistakes prior to the final structure of the table being output. This human-in-the-loop aspect of the system means the system can achieve both efficiency gains for easy-to-interpret cases, while ensuring high accuracy for difficult cases that are inherently ambiguous or unfamiliar to the system. It also means the system 100 can efficiently incorporate feedback to improve itself and adapt to new domains over time.

The document processing system 100 may be used to search for relevant documents and automatically index the content in any table within a document and surface it in response to a user query.

The document processing system 100 may also be used for digitizing printed documents by recognizing tables and in combination with an OCR (optical character recognition) system, read the data within a table and preserve it in an unambiguous, structured digital format.

The document processing system 100 may be used to help create new tables in structured, digital formats by enabling a user to first design the table more quickly or more intuitively in an unstructured format and then automatically export to a structured format when the user is finished.

Some of the novel aspects of the document processing system 100 include a new approach to modeling objects in machine learning-based object detection as potentially including abstract and hierarchical groupings of elements rather than just discrete objects, which enables modeling of table extraction as a hierarchical grouping and bounding box detection problem. In this framework, overlap between a larger box and a smaller box of different object classes can be interpreted as containment or a parent-child relationship between the larger container, or box, and the smaller object, or box, it contains, rather than as occlusion between discrete objects, as is how boxes are modeled in established approaches.

The document processing system 100 bounding box recognition models 115 and 125 may be trained with a large and rich dataset by algorithmically and intelligently processing public sources of data that contain both visual representations of tables along with loosely associated table structure information, which may be expressed as XML. All desired object classes are discernable from the XML.

The use of such data allows correlation of the structure information to the visual representation within the documents, allowing identification of bounding boxes for the tables as well as for objects within the tables and labeling of the identified bounding boxes. In one example, the labels may include numbers describing box coordinates and an object class label. The trained models may then be used to recognize tables in documents that contain tables without their explicit structure information.

The document processing system 100 may also provide efficient and effective ways for a user to control the table recognition process. The modeling of much of the recognition process in terms of object detection means the output of the system 100 at intermediate stages is interpretable by a human. This allows a user to verify the output of an intermediate stage is correct, and if there are mistakes, the user can intervene to make corrections and execute the remaining stages of the system with the corrections.

The document processing system 100 may also include a user interface to present multiple table recognition proposals to a human, who can then pick the most relevant one, interactively, to serve the immediate need for the data. A fail-safe mechanism may be provided for the system to reliably recognize when its output is not likely to be correct and to try alternative methods or interrupt an automated extraction pipeline and notify a user to intervene on failures before sending the output downstream. An efficient mechanism allows the system to use feedback from user corrections and approvals to improve itself over time.

User Experience Examples

Figure 2:
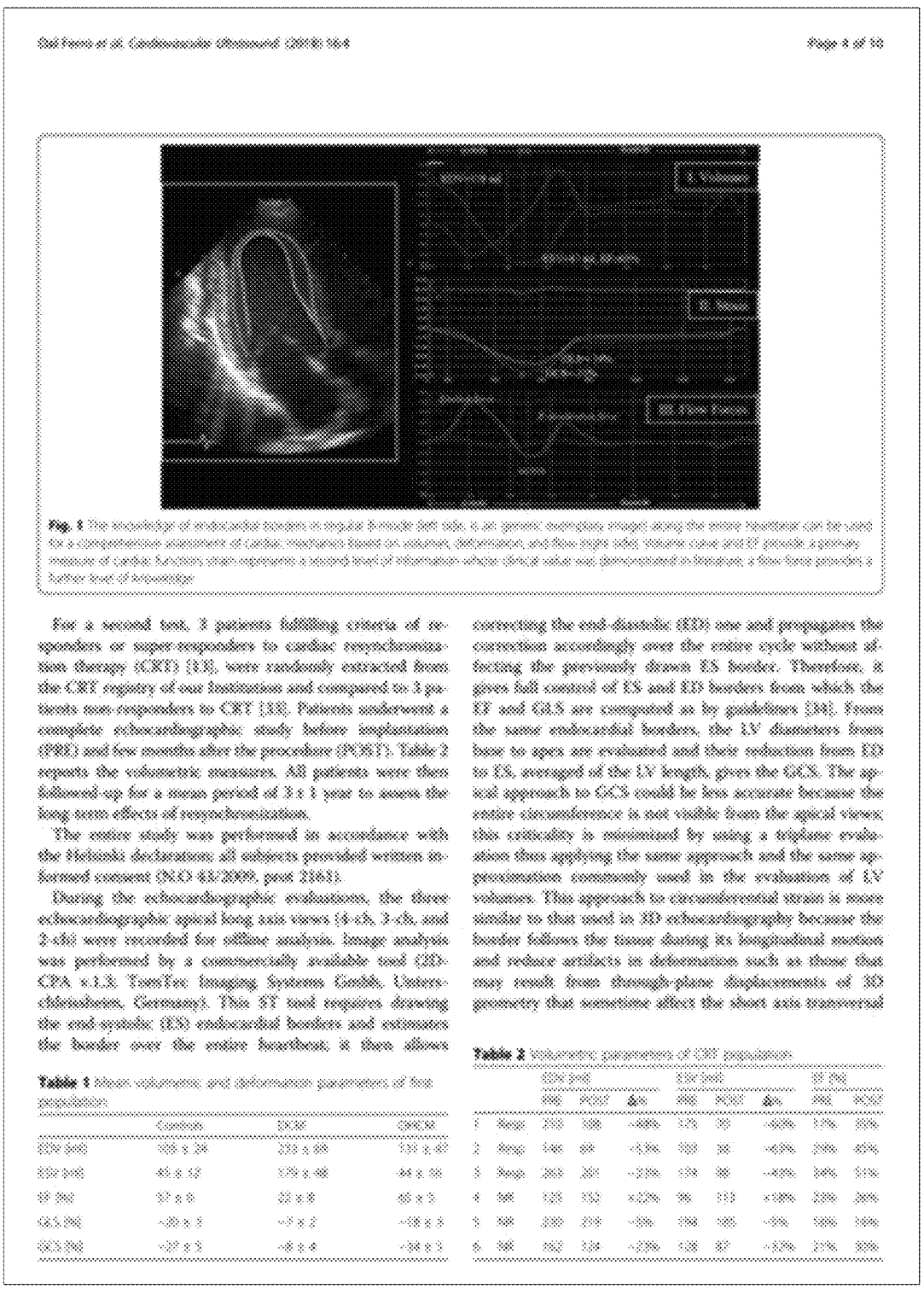
FIG. 2 is an example document having tables according to an example embodiment.

A user of the system 100 may be reading a research paper when they see a couple of tables that contain interesting data as shown in FIG. 2. Note that FIG. 2 is not shown for an understanding of the text, but merely to illustrate that there are one or more tables on a page of a document.

Figure 3:
FIG. 3 is an example document illustrating an identified table according to an example embodiment.

The user can mark the table regions or the system model 115 can propose regions for the recognized tables as shown in FIG. 3 with broken lines identifying bounding boxes for two tables.

The system 100 cropper 120 extracts the tables as shown at table 400 in FIG. 4 and at table 500 in FIG. 5. The table structure recognition and interpretation model 125 detects rows 401, 402, 403, 404, 405, 406, 407, and 408, columns 410, 411, 412, 413, 414, 415, 416, 417, 418, and 419, headers (column headers encompassing rows 401 and 402 and row header 410), and supercells for an isolated table, which are overlaid and displayed in FIG. 4, as overlapping bounding boxes. There are three supercells in FIG. 4, defined by cells intersecting row 401 and columns 412, 413, and 414, columns 415, 416, and 417, and columns 418 and 419.

In FIG. 5, the table structure recognition and interpretation model 125 detects rows 501, 502, 503, 504, 505, and 506, columns 510, 511, 512, and 513, headers (column header 501 and row header 510), and supercells (none present in this example) for the isolated table 500, which are overlaid and displayed here as overlapping bounded boxes.

The extracted data is shown in FIG. 6. Since the system 100 has converted the data at exporter 135 from the document to a computable representation, the data can now be exported as output 140 to Excel or any other format which can be plotted, modified, and analyzed using statistical packages.

If there is a collection of documents with tables that conform to some template or schema, the system 100 can be used to do bulk recognition and export of the data to formats with even more structure, including SQL databases.

The system 100 enables a user to input an isolated table, document page, or an entire document, and performs recognition and extraction for each table in the input. In general, a system for table extraction must address three subproblems: table detection, table structure recognition, and table interpretation.

Table detection involves determining the location of the table within its surrounding document as shown in FIG. 7.

Table structure recognition is the problem of determining the cell structure of the table as shown in FIG. 8.

Table interpretation is the problem of determining the function of each cell (i.e., which cells are in the header(s) and which cells are in the body of the table). Cells in the header(s) correspond to the table's keys and are referred to as access cells. While cells in the body correspond to the table's values and are referred to as data cells as shown in FIG. 9.

The table extraction procedure as described above is divided into two distinct stages: 1) table detection from an image of a document page, followed by 2) table structure recognition and interpretation on a cropped image or otherwise isolated table (as is produced by stage one). Table detection may also be performed by a user by marking a bounding box around a table in a page of a document and providing that as input to the extractor 120.

One novel aspect of the system 100 is the modeling design, with a second-stage object detection model 125 that compactly models both table structure recognition and table interpretation as a single unified object detection task Additionally, in both stages object detection is modeled more abstractly than in typical approaches, where objects are free to coincide and this overlap between objects can imply a containment (or hierarchical) relationship between the two, rather than one object occluding another. For example, in this framework, a table and a caption can be separate objects but a higher-level container object that is large enough to include both objects can be used to group them together under the same parent object, and establish a relationship between the two.

Other systems have attempted to model some aspects of structure recognition as object detection. For example, some systems may detect the columns or rows within a table, but these systems are incomplete and do not address all the aspects necessary to recognize the structure of a table and interpret it. None of these systems models the problem abstractly as a set prediction problem, with objects free of prior assumptions about what kinds of overlap may occur between them. Additional prior systems attempt to model table structure recognition quite differently as an image-to-text problem and produce an HTML representation of the table as output. These systems are more opaque, less self-correcting, and lack many of the human-in-the-loop aspects that the proposed system features.

Figure 10:
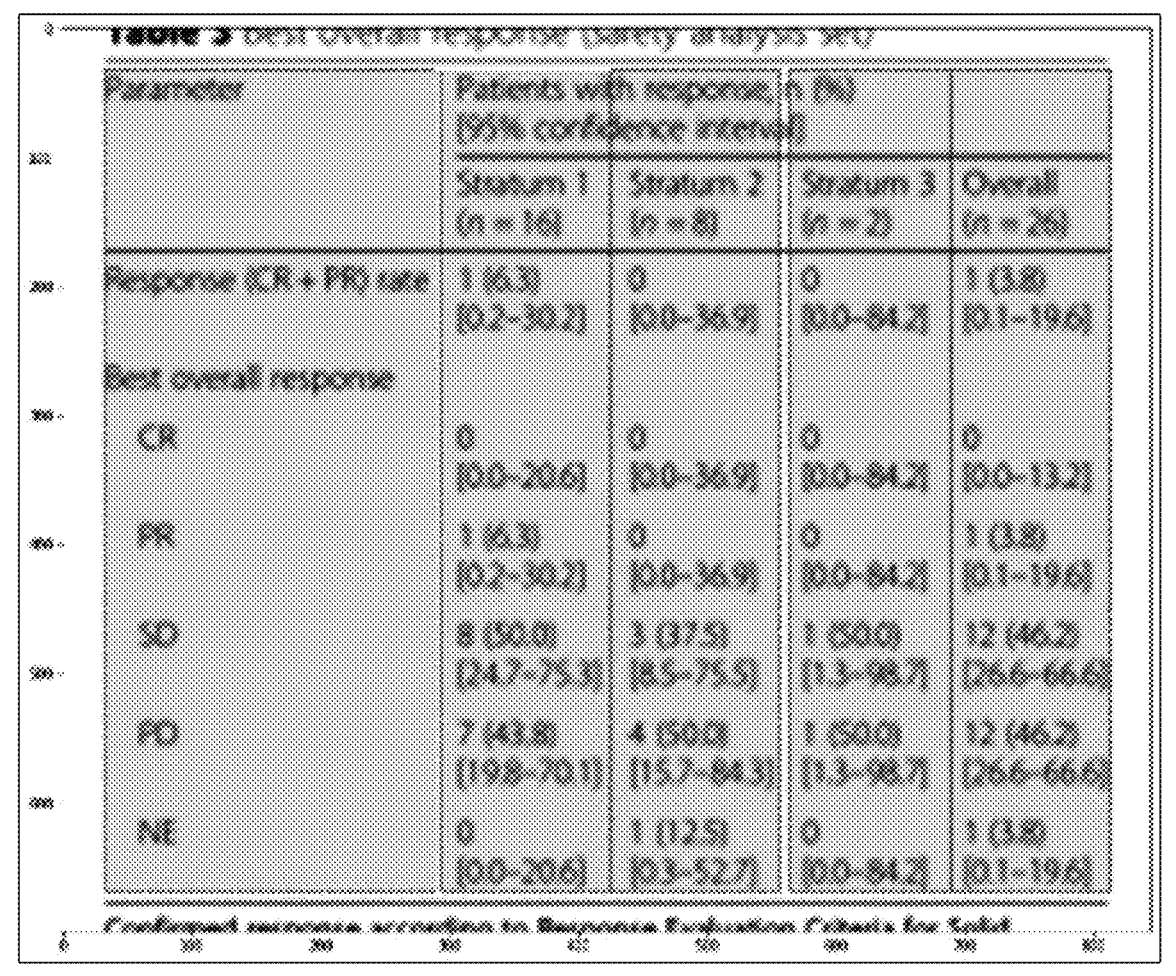
Figure 11:
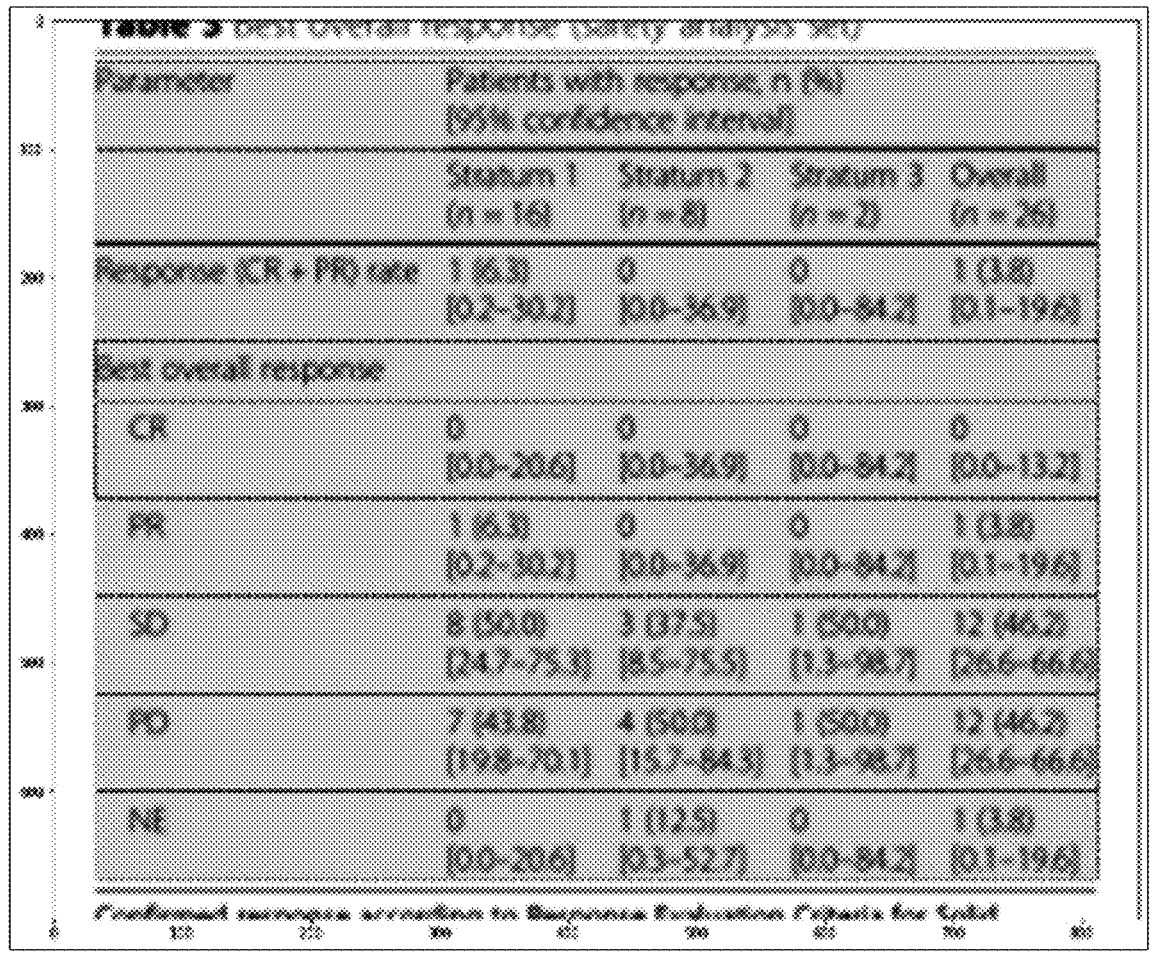
Figure 12:
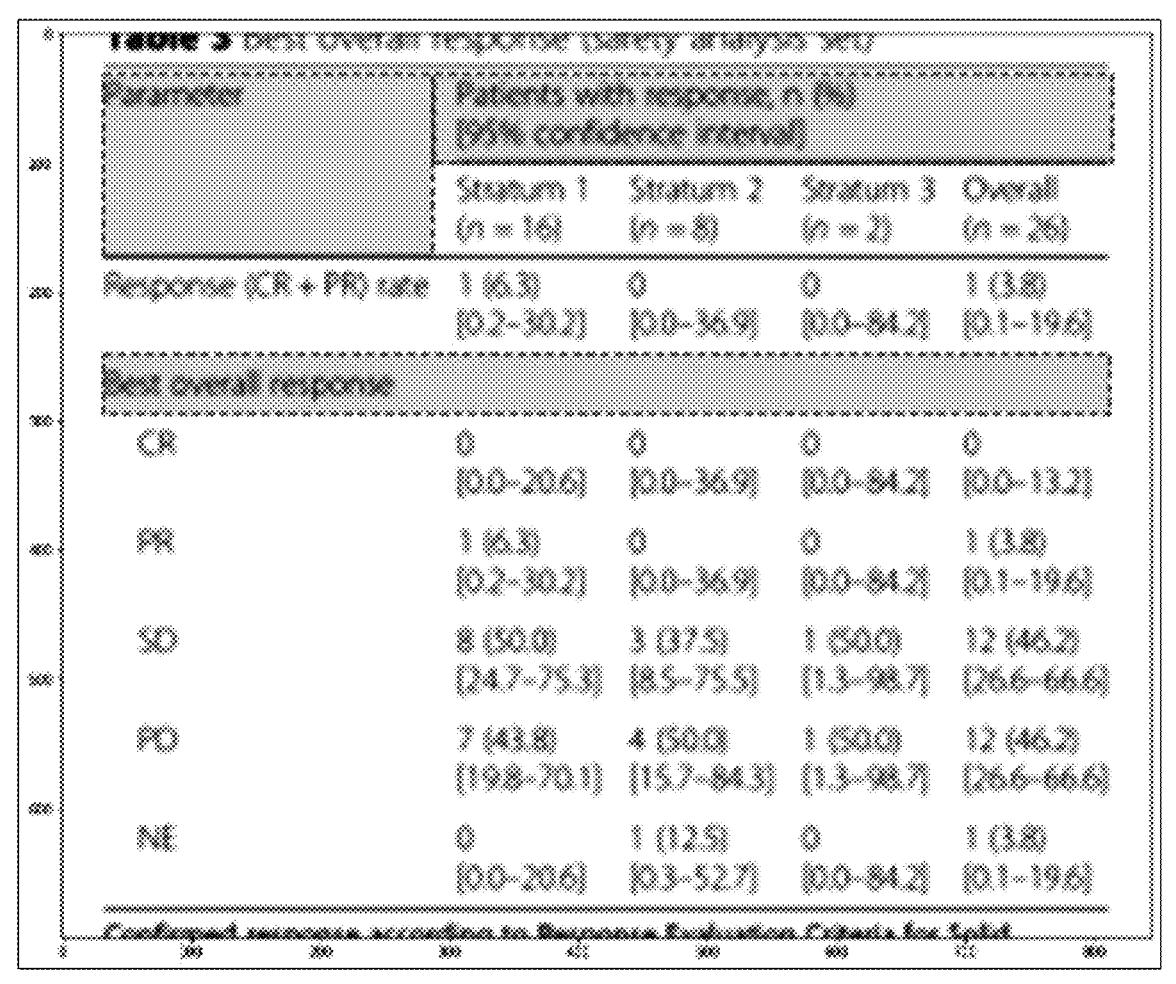

The joint modeling of table structure recognition and table interpretation as an object detection problem is achieved using six object classes. The first three classes are columns, rows, and supercells (also called "merged cells" or "spanning cells"). These three classes recognize the cell structure of the table. Each intersection of a column and a row forms a grid cell. The supercell object class detects when grid cells in the table are merged as shown in FIGS. 10, 11, and 12.

The second three classes are column headers, row headers, and subheaders. These three object classes are used to interpret the table (identify which cells contain access cells, or keys, and which cells contain data cells, or values). Column headers objects group together and identify the access cells that usually appear at the top of the table. Row header objects group together and identify the access cells that usually appear on the left of the table. A subheader is a special object class that appears in many tables presented within documents. A subheader occurs when a supercell coincides with a row. In this case, the content of the supercell is meant to join with one or more cells below it in the row header to form compound keys. This table design saves horizontal space, as it is equivalent to having an additional column of supercells in the leftmost portion of the row header.

The model for object detection is achieved using a convolutional neural network and a transformer network comprising a transformer encoder and transformer decoder. Unlike other architectures for object detection, this architecture can implement object detection with the generality required to output the complete set of table objects, including columns, rows, headers, and supercells, etc. Until recently, advances in deep learning for object detection primarily targeted a specialized version of the object detection problem: detecting objects in natural images. Objects in natural images typically require only local context to be reliably detected, which simplifies the modeling required. Furthermore, overlap between bounding boxes in this setting is typically interpreted as occlusion. Thus, in object detection in settings such as these, two objects could never have the same bounding box, and every bounding box could be assumed to have a single classification label.

Figure 13:
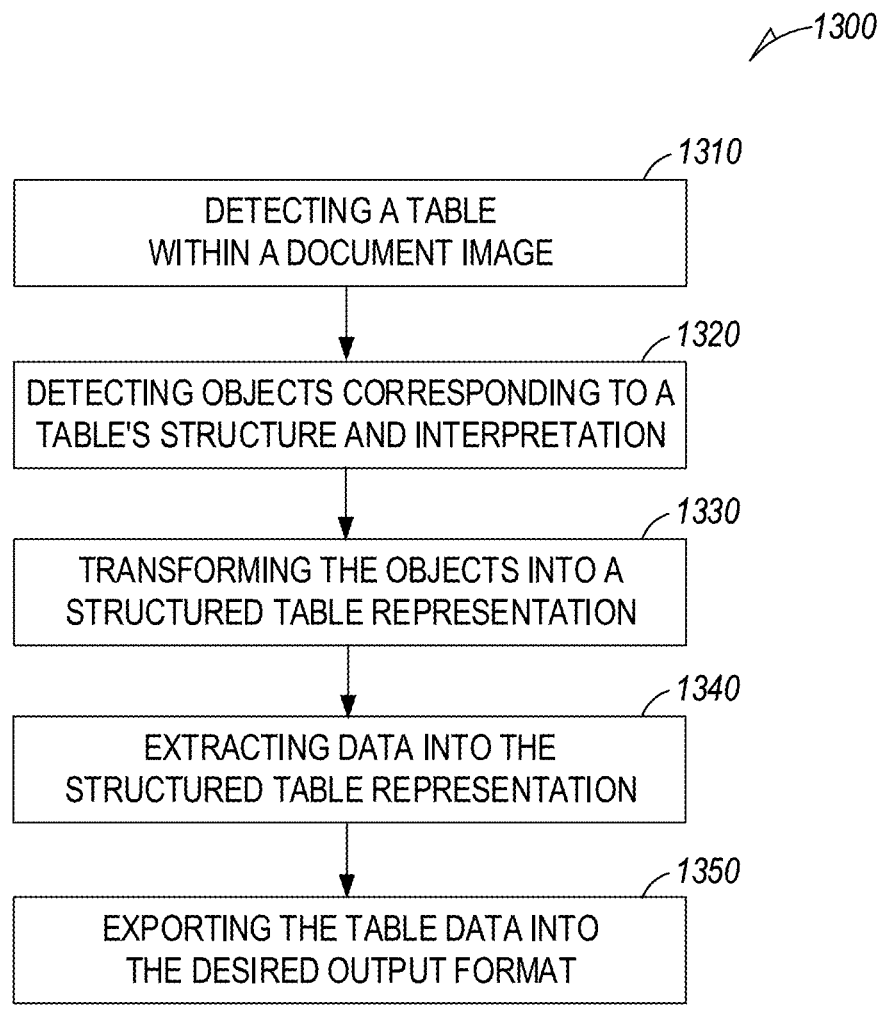
FIG. 13 is a flowchart of a computer implemented method of identifying tables and table structure from a document page according to an example embodiment.

FIG. 13 is a flowchart of a computer implemented method 1300 of identifying tables and table structure from a document page according to an example embodiment. Method 1300 begins by detecting a table within a document image at operation 1310. The detection may be performed by receiving input from a user outlining a table from a document page with a bounding box, or by using a trained machine learning model trained on document pages having tables labeled by bounding boxes.

Detecting a table from a document image at operation 1310 may be performed by providing images of pages of the document as input to a table detection model trained to detect tables. The table recognition neural network model may be a convolutional neural network followed by a transformer encoder and transformer decoder.

At operation 1320, table objects are detected via a table structure recognition and interpretation model that models a table's structure and interpretation in the image as a set of overlapping bounding boxes, where the overlap indicates that the objects coincide rather than occlude. In various examples, the table objects may comprise columns, rows, supercells, column headers, row headers, and subheaders.

The table object recognition model may include a convolutional neural network followed by a transformer encoder and transformer decoder. Training data for the table object recognition model may include images of tables having labels for table objects within the images derived from corresponding structural information for each table. Some publications routinely provide such structural information for tables in addition to the unstructured tables that are provided in PDF or other image format. In further embodiments, tables published electronically may already include structure information. Table images for training may be generated from such structure information and labeled.

At operation 1330, the table objects are transformed into a structured representation of the table. At operation 1340, data is extracted into the structured table representation. Extraction may be performed by recognizing text from each table object and associating the text with cells represented by the structured representation of the table.

At operation 1350, the table and its data are exported for use by a user or an application. Various formats may be exported for directly copying and pasting into applications.

Figure 14:
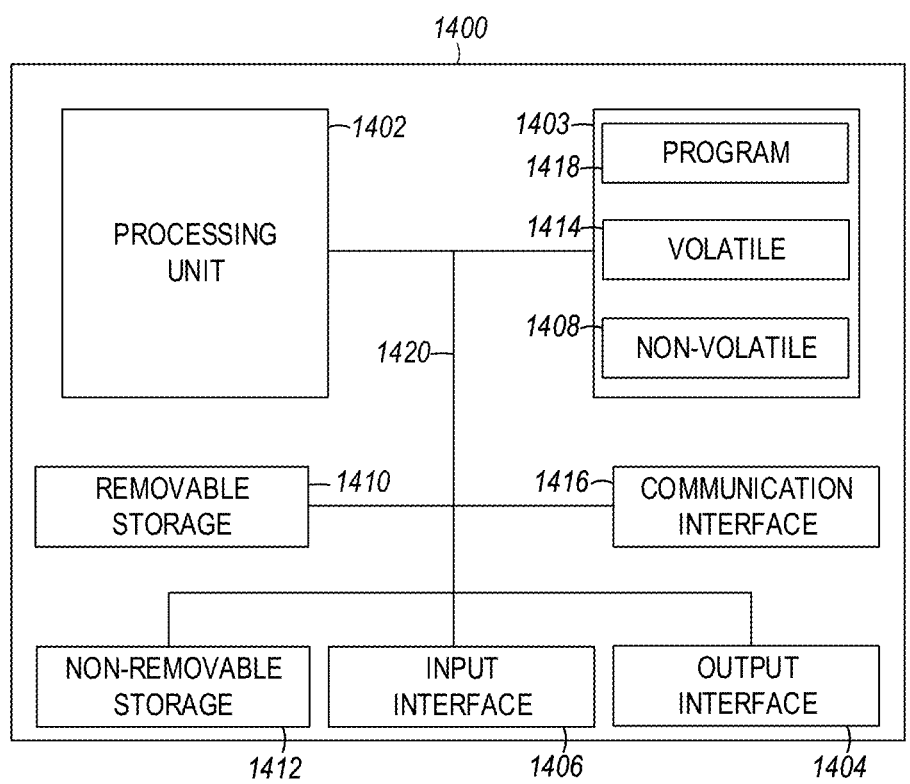
FIG. 14 is a block schematic diagram of a computer system to implement one or more example embodiments.

FIG. 14 is a block schematic diagram of a computer system 1400 for implementing system 100 and performing methods and algorithms according to example embodiments. All components need not be used in various embodiments.

One example computing device in the form of a computer 1400 may include a processing unit 1402, memory 1403, removable storage 1410, and non-removable storage 1412. Although the example computing device is illustrated and described as computer 1400, the computing device may be in different forms in different embodiments. For example, the computing device may instead be a smartphone, a tablet, smartwatch, smart storage device (SSD), or other computing device including the same or similar elements as illustrated and described with regard to FIG. 14. Devices, such as smartphones, tablets, and smartwatches, are generally collectively referred to as mobile devices or user equipment.

Although the various data storage elements are illustrated as part of the computer 1400, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1403 may include volatile memory 1414 and non-volatile memory 1408. Computer 1400 may include— or have access to a computing environment that includes—a variety of computer-readable media, such as volatile memory 1414 and non-volatile memory 1408, removable storage 1410 and non-removable storage 1412. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer- readable instructions.

Computer 1400 may include or have access to a computing environment that includes input interface 1406, output interface 1404, and a communication interface 1416. Output interface 1404 may include a display device, such as a touchscreen, that also may serve as an input device. The input interface 1406 may include one or more of a touchscreen, touchpad, mouse, keyboard, camera, one or more device-specific buttons, one or more sensors integrated within or coupled via wired or wireless data connections to the computer 1400, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1400 are connected with a system bus 1420.

Computer-readable instructions stored on a computer-readable medium are executable by the processing unit 1402 of the computer 1400, such as a program 1418. The program 1418 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 1418 along with the workspace manager 1422 may be used to cause processing unit 1402 to perform one or more methods or algorithms described herein.

Figure 15:
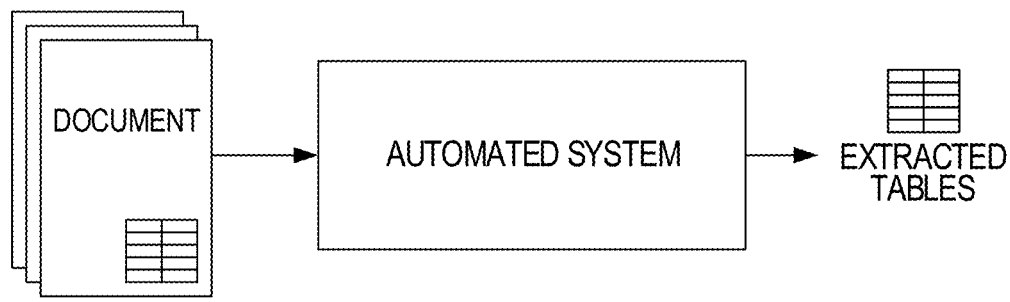
FIG. 15 is a block flow diagram of an automated system for extracting tables from documents.

FIG. 15 is a block flow diagram of an automated system for extracting tables from documents.

Figure 16:
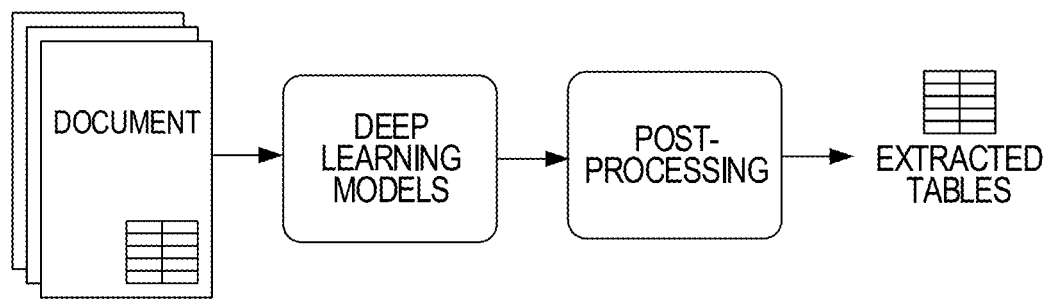
FIG. 16 is a block flow diagram of an automated system for extracting tables from documents using deep learning models with post- processing to generate extracted tables.

FIG. 16 is a block flow diagram of an automated system for extracting tables from documents using deep learning models. The deep learning models detect tables as a collection of bounding boxes. Post-processing converts the model output, the collection of bounding boxes, to a structured table representation and extracts the table's data. Post-processing also converts the extracted table to a final output format such as CSV, Excel, or another desired format.

Figure 17:
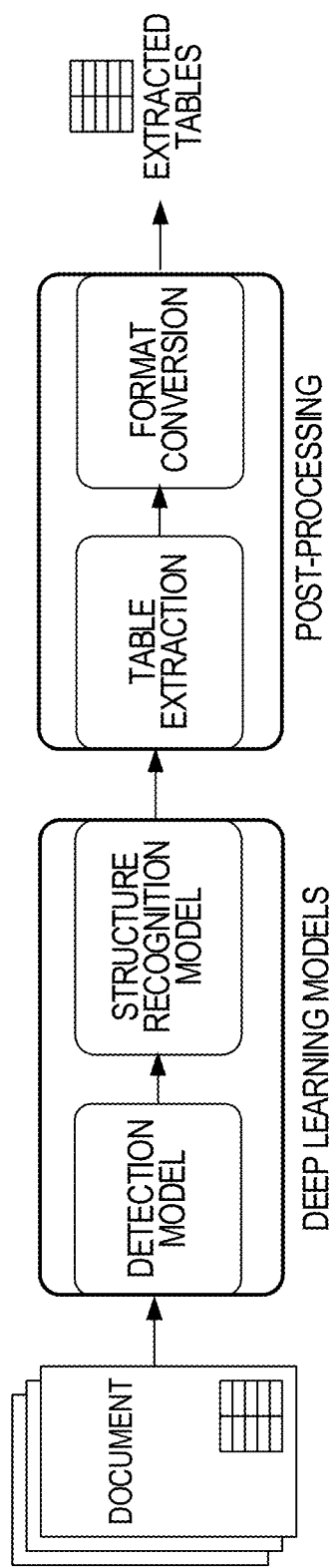
FIG. 17 is a block flow diagram with more details of an automated system for extracting tables from documents using deep learning models with post processing to generate extracted tables.

FIG. 17 is a block flow diagram of an automated system for extracting tables from documents using deep learning models with post-processing to generate extracted tables.

Figure 18:
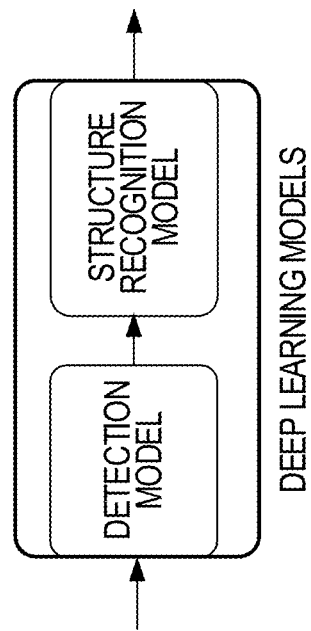
FIG. 18 is a block diagram showing two stages of deep learning models for detecting tables in documents and recognizing the structure of the tables.

FIG. 18 is a block diagram showing two stages of deep learning models for detecting tables in documents and recognizing the structure of the tables.

Figure 19:
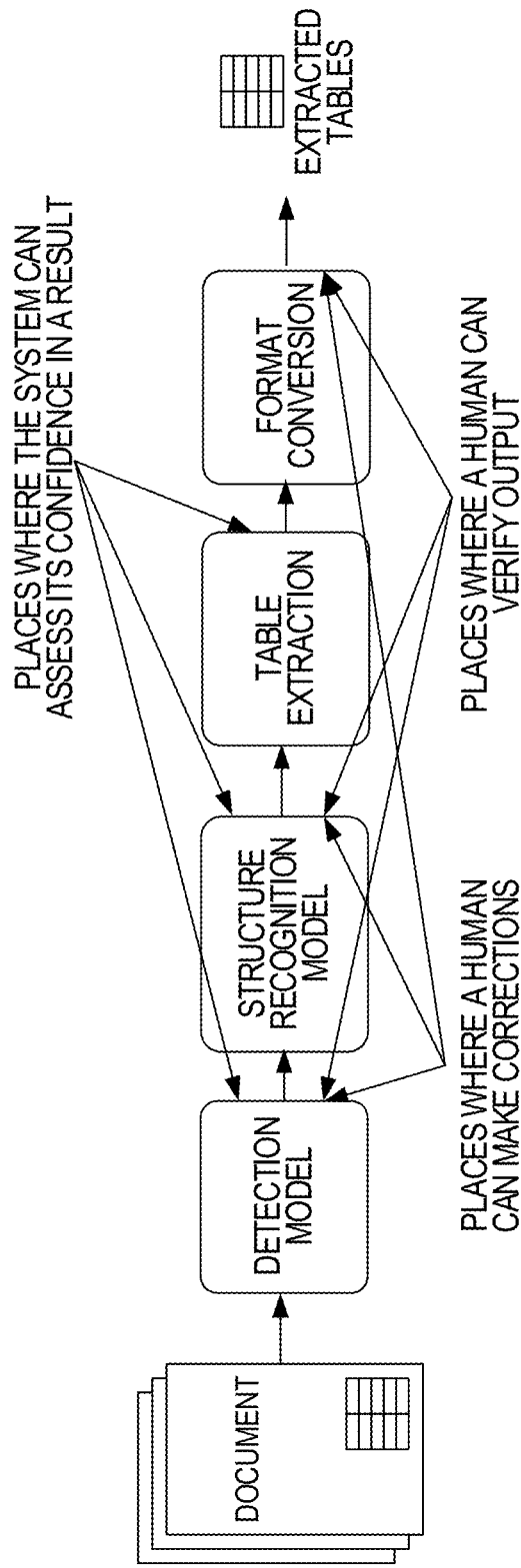
FIG. 19 is a block flow diagram of an automated system for extracting tables from documents using deep learning models illustrating points where user corrections and system assessments may be made.

FIG. 19 is a block flow diagram of an automated system for extracting tables from documents using deep learning models illustrating points where user corrections and system assessments may be made.

Figure 20:
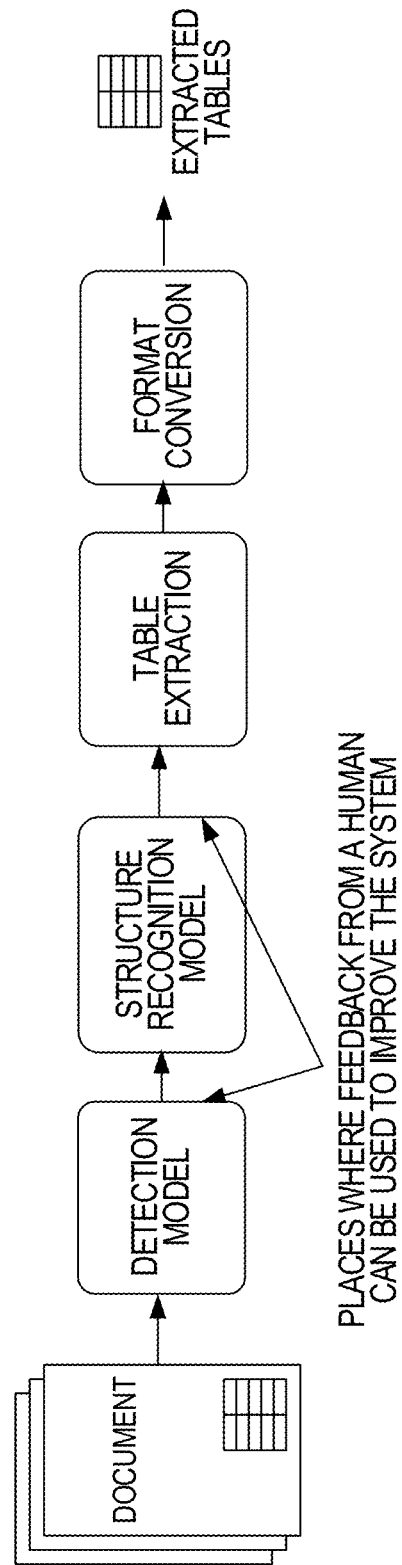
FIG. 20 is a block flow diagram of an automated system for extracting tables from documents using deep learning models illustrating points where user feedback to improve model performance may be provided and used to improve the system.

FIG. 20 is a block flow diagram of an automated system for extracting tables from documents using deep learning models illustrating points where user feedback to improve model performance may be provided and used to improve the system.

Examples

1. A computer implemented method includes detecting a table within a document image, detecting table objects via a table structure recognition and interpretation model that models table structure and interpretation as a set of overlapping bounding boxes within an image, transforming the table objects into a structured table representation, extracting data from the table objects into the structured table representation, and exporting the structured table representation and its data into a desired output format.
2. The method of example 1 wherein the table objects comprise columns, rows, and supercells.
3. The method of example 2 wherein the table objects further comprise column headers, row headers, and subheaders.
4. The method of any of examples 1-3 wherein detecting a table within a document comprises providing images of pages of the document as input to a table detection neural network model trained to detect tables.
5. The method of example 4 wherein the table detection neural network model comprises a convolutional neural network followed by a transformer encoder and transformer decoder.
6. The method of any of examples 1-5 wherein the table structure recognition and interpretation model comprises a convolutional neural network followed by a transformer encoder and transformer decoder.
7. The method of example 6 wherein training data for the table structure recognition and interpretation model comprises images of tables having labels for table objects within the images derived from corresponding structural information for each table.

8. A machine-readable storage device has instructions for execution by a processor of a machine to cause the processor to perform operations to perform any of the methods of examples 1-7.

9. A device includes a processor and a memory device coupled to the processor and having a program stored thereon for execution by the processor to perform operations to perform any of the methods of examples 1-7.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
    detecting a table within a document image;
    detecting table objects within the table via a table structure recognition and interpretation model that models table structure and interpretation as a set of overlapping bounding boxes within an image;
    transforming the table objects into a structured table representation in part by interpreting overlapping table objects as a hierarchical relationship between table objects;
    extracting data from the table objects into the structured table representation; and
    exporting the structured table representation and its data into a final output format.

2. The method of claim 1 wherein the table objects comprise columns, rows, and supercells.

3. The method of claim 2 wherein the table objects further comprise column headers, row headers, and subheaders.

4. The method of claim 1 wherein detecting a table within a document comprises providing images of pages of the document as input to a table detection neural network model trained on images of tables with different types of bounding boxes to detect tables.

5. The method of claim 4 wherein the table detection neural network model comprises a convolutional neural network followed by a transformer encoder and transformer decoder.

6. The method of claim 1 wherein the table structure recognition and interpretation model comprises a convolutional neural network followed by a transformer encoder and transformer decoder.

7. The method of claim 6 wherein training data for the table structure recognition and interpretation model comprises images of tables having labels for table objects within the images derived from corresponding structural information for each table.

8. A machine-readable storage device having instructions for execution by a processor of a machine to cause the processor to perform operations to perform a method comprising:
    detecting a table within a document image;
    detecting table objects within the table via a table structure recognition and interpretation model that models table structure and interpretation as a set of overlapping bounding boxes within an image;
    transforming the table objects into a structured table representation;
    extracting data from the table objects into the structured table representation; and
    exporting the structured table representation and its data into a final output format.

9. The device of claim 8 wherein the table objects comprise columns, rows, and supercells.

10. The device of claim 9 wherein the table objects further comprise column headers, row headers, and subheaders.

11. The device of claim 8 wherein detecting a table within a document comprises providing images of pages of the document as input to a table detection neural network model trained to detect tables.

12. The device of claim 11 wherein the table detection neural network model comprises a convolutional neural network followed by a transformer encoder and transformer decoder.

13. The device of claim 8 wherein the table structure recognition and interpretation model comprises a convolutional neural network followed by a transformer encoder and transformer decoder.

14. The device of claim 13 wherein training data for the table structure recognition and interpretation model comprises images of tables having labels for table objects within the images derived from corresponding structural information for each table.

15. A device comprising:
    a processor; and
    a memory device coupled to the processor and having a program stored thereon for execution by the processor to perform operations to perform a method comprising:
        detecting a table within a document image;
        detecting table objects within the table via a table structure recognition and interpretation model that models table structure and interpretation as a set of overlapping bounding boxes within an image;
        transforming the table objects into a structured table representation;
        extracting data from the table objects into the structured table representation; and
        exporting the structured table representation and its data into a final output format.

16. The device of claim 15 wherein the table objects comprise columns, rows, and supercells.

17. The device of claim 16 wherein the table objects further comprise column headers, row headers, and subheaders.

18. The device of claim 15 wherein detecting a table within a document comprises providing images of pages of the document as input to a table detection neural network model trained to detect tables, wherein the table detection neural network model comprises a convolutional neural network followed by a transformer encoder and transformer decoder.

19. The device of claim 15 wherein the table structure recognition and interpretation model comprises a convolutional neural network followed by a transformer encoder and transformer decoder, and wherein training data for the table structure recognition and interpretation model comprises images of tables having labels for table objects within the images derived from corresponding structural information for each table.

* * * * *